United States Patent [19]

Germer

[11] 4,093,997
[45] June 6, 1978

[54] PORTABLE PROGRAMMER FOR TIME-OF-DAY METERING REGISTER SYSTEM AND METHOD OF USING SAME

[75] Inventor: Warren R. Germer, Rochester, N.H.

[73] Assignee: General Electric Company, Somersworth, N.H.

[21] Appl. No.: 724,040

[22] Filed: Sep. 17, 1976

[51] Int. Cl.² ............................................. G06F 1/00
[52] U.S. Cl. .................................................. 364/900
[58] Field of Search .................. 235/151.21; 340/150, 340/151; 324/103 R; 364/900 MS File

[56] References Cited

U.S. PATENT DOCUMENTS

| | | | |
|---|---|---|---|
| 3,913,014 | 10/1975 | Halstead et al. | 324/103 R |
| 3,944,984 | 3/1976 | Morley et al. | 340/172.5 |
| 4,008,458 | 2/1977 | Wensley | 340/151 |

*Primary Examiner*—Raulfe B. Zache
*Attorney, Agent, or Firm*—Robert E. Brunson; Francis X. Doyle

[57] ABSTRACT

A portable programmer is disclosed for programming and testing a multiple rate meter such as an electronic time-of-day meter system. The portable programmer includes a quartz crystal controlled seven-day clock. A time comparator is driven in synchronism with a signal which drives the clock in the time-of-day meter. When the time of the time comparator is equal to that of the programmer's timer, a compare signal is generated to switch the time in the meter to its standard time base. A programmable read-only memory in the portable programmer stores a plurality of different programs, each of which can be selectively read into the time-of-day meter. The output of the programmable read-only memory is read out and compared with the time generated by the time comparator. When a comparison exists an output is generated to a program comparator which compares the control output of the time-of-day meter with the control output signal from the portable programmer, and if a comparison exists an indication is given indicating that the program has been properly read into the time-of-day meter. A method of programming and testing a multiple rate metering system by using the portable programmer is also disclosed.

12 Claims, 9 Drawing Figures

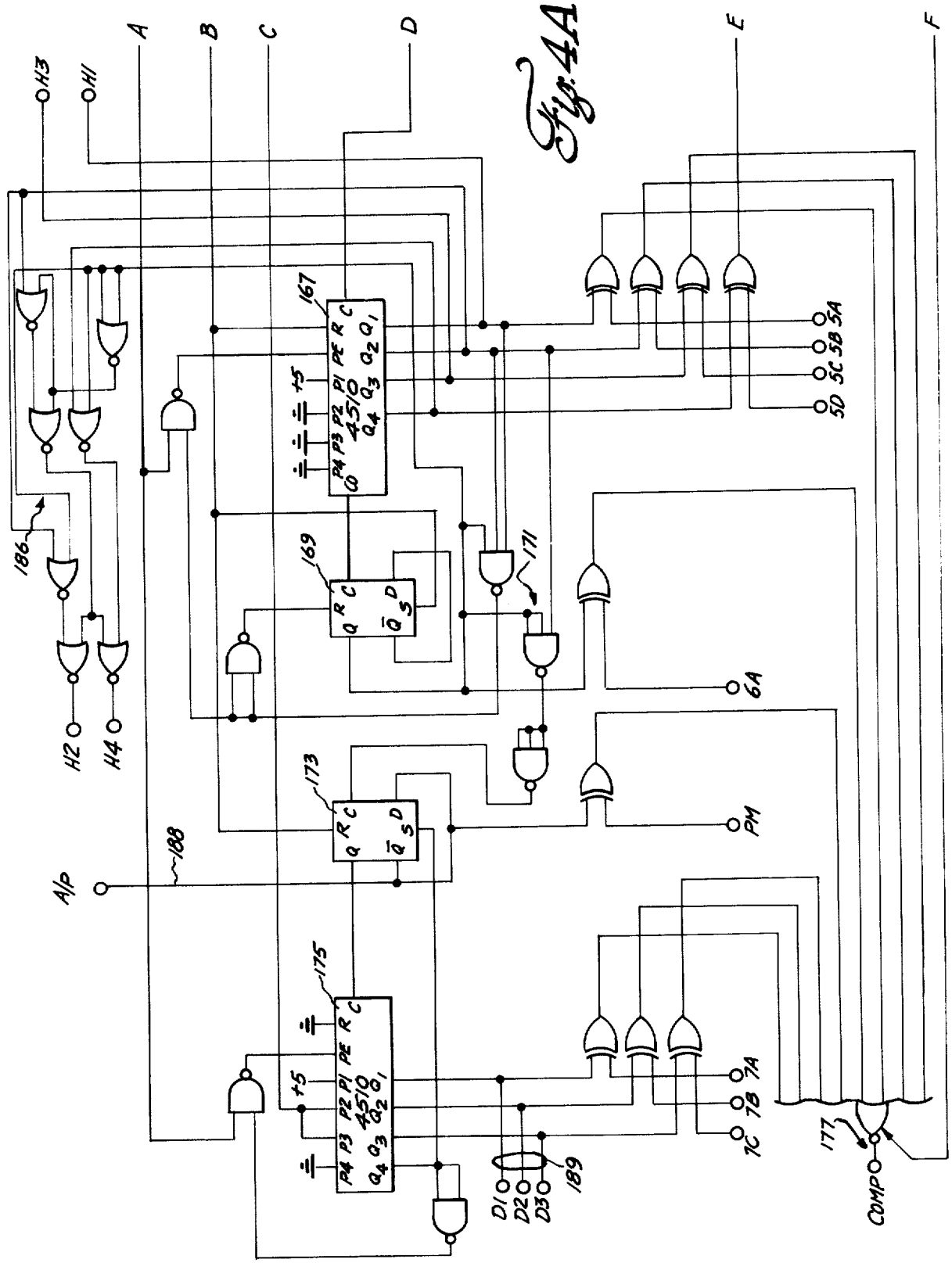

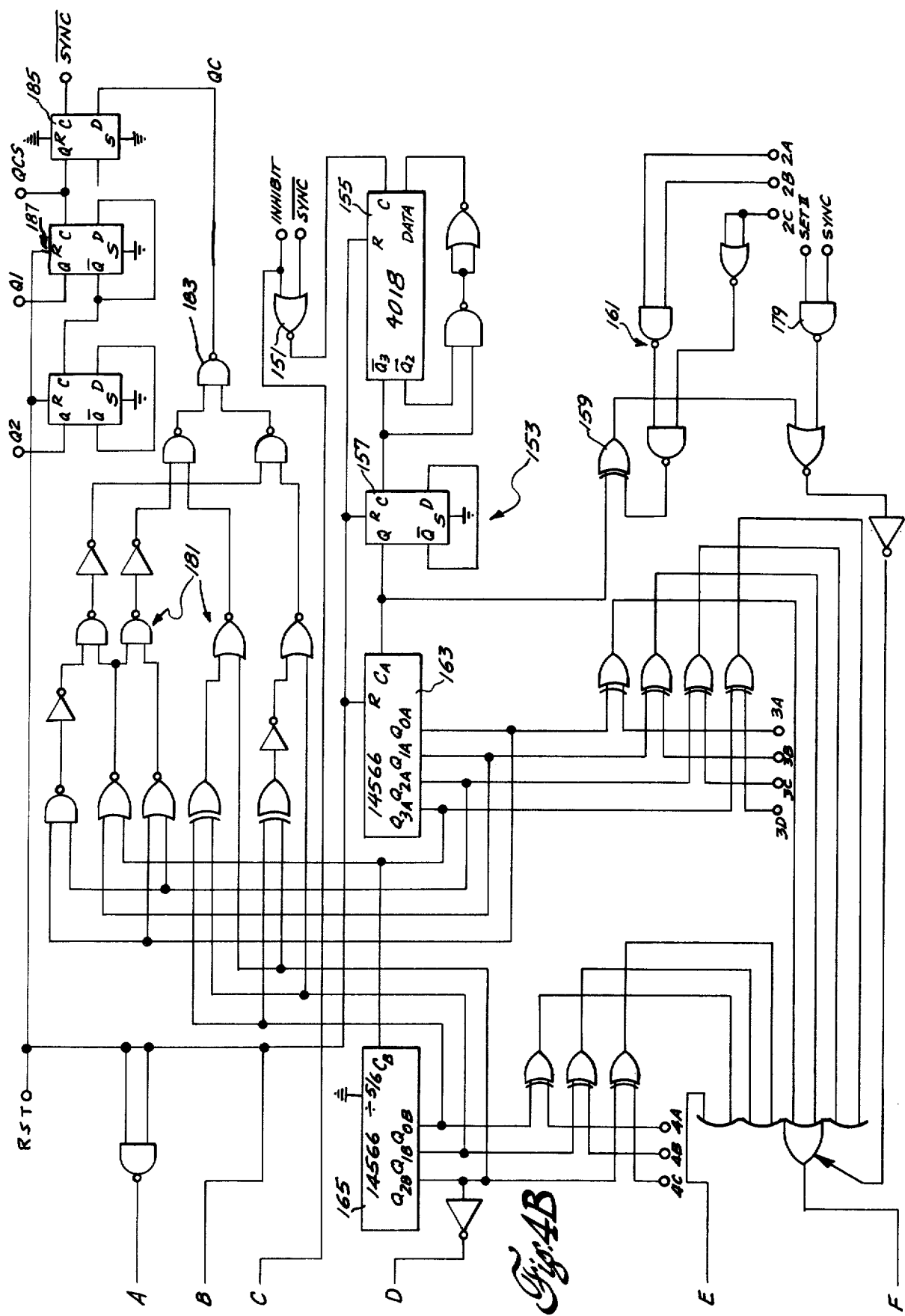

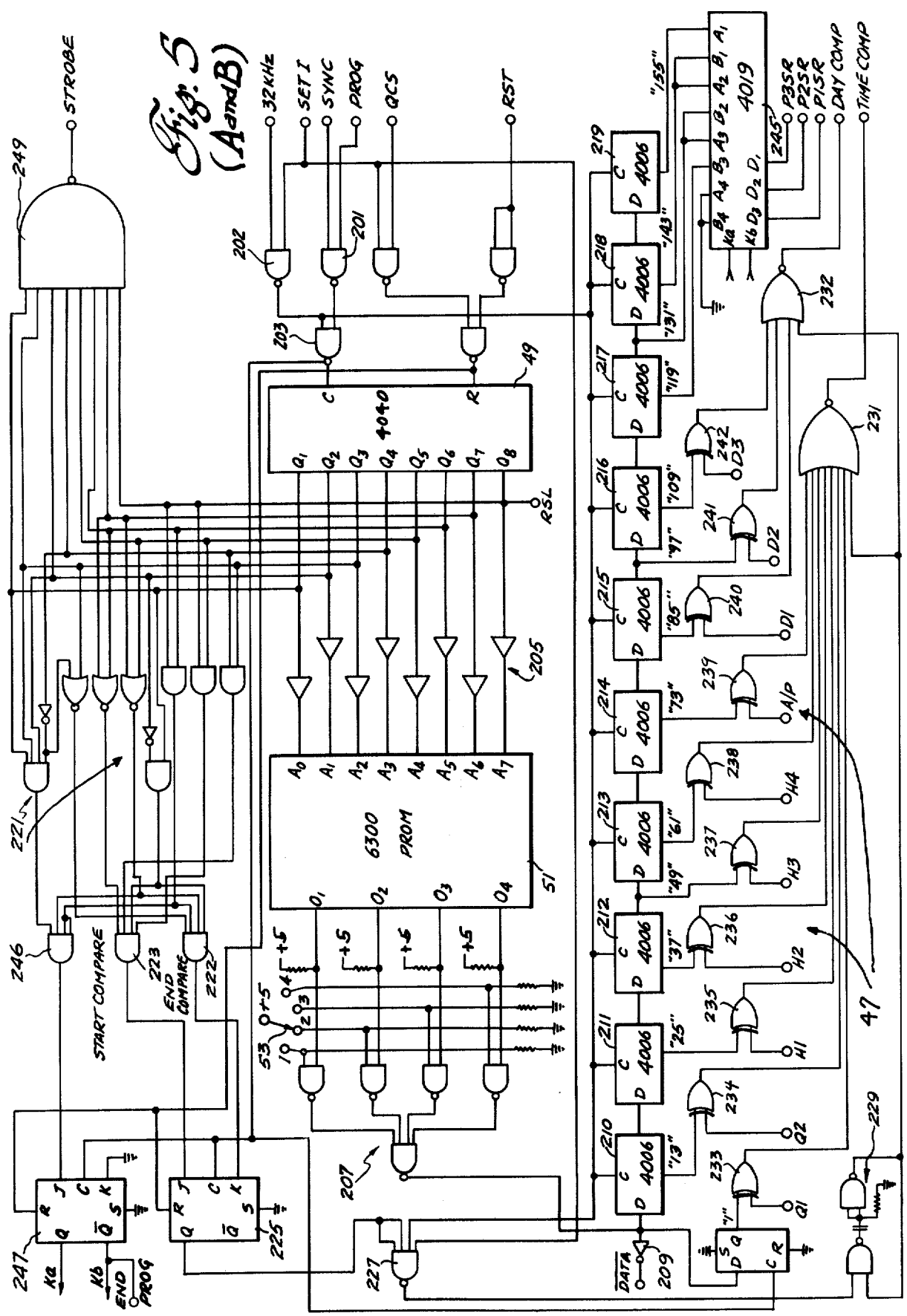

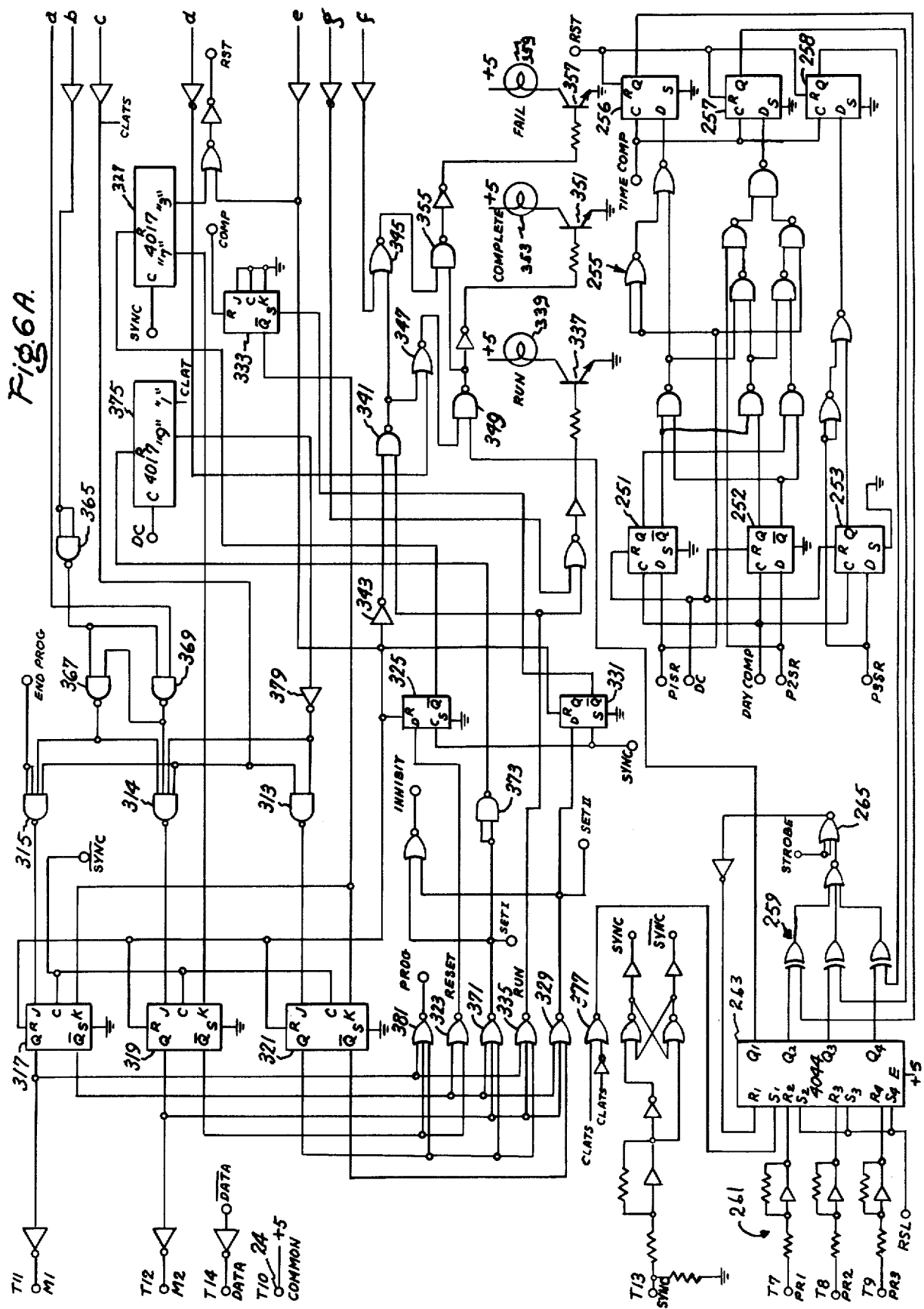

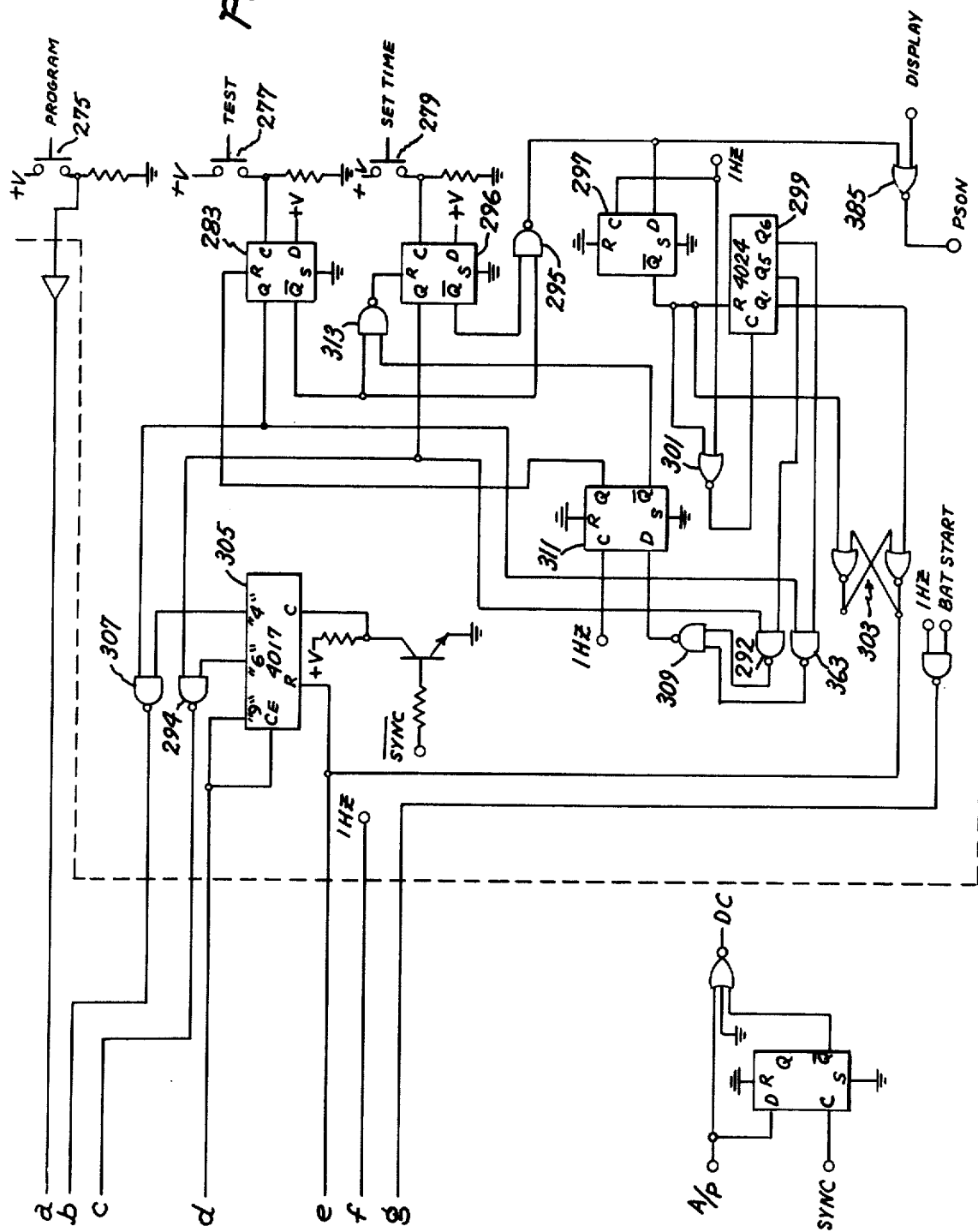

PORTABLE PROGRAMMER FOR TIME-OF-DAY METERING REGISTER SYSTEM AND METHOD OF USING SAME

BACKGROUND OF THE INVENTION

This invention relates to a method and apparatus for programming and testing a time-of-day metering register In electrical distribution systems electrical energy has heretofore been sold quite generally on a fixed rate schedule irrespective of whether a high or low demand has been made on the electrical generation system. Because of this, electrical generation and distribution systems have been found to be at times overloaded and at other times, under utilized. This results in substantial inefficiencies since a substantially larger plant and distribution system is required than is economically desirable in order to meet the peak demands of the subscribers to the distribution system.

In order to provide for more efficient use of the electrical generation and distribution facilities during off-peak load periods, attempts have been made to provide incentives to users of electrical power to encourage them to use as much power as possible during off-peak intervals. One such method has been to change the billing structure for electrical utilities so that the customer pays less for electricity used during the distribution system's off-peak periods and conversely pays more for electricity used during beak or near-peak periods. Such a billing system requires a time-of-day metering apparatus capable of measuring the consumption of electrical power during predetermined peak power demand intervals. One such time-of-day metering system is disclosed in copending U.S. patent application Ser. No. 724,041, filed on even date herewith and assigned to the common assignee herewith. The subject matter of that patent application is incorporated herein by reference thereto.

Such time-of-day meters drive a first set of decade gear-driven dials on a continuous basis to record the total consumption of power. One or more other sets of decade-gear-driven dials, designated alternate rate dials, are selectively activated at predetermined times during the week to record the consumption of electrical power during such selected time intervals. One a seasonal basis the peak demand intervals for electrical energy from a given distribution system change with respect to the time-of-day and time-of-week so that, for example, during winter the peak demand intervals in a given day may be at a first time; whereas, during the summer, the peak demand intervals in any given day may be during other time periods. It is, therefore, highly desirable to have a method and apparatus for reprogramming time-of-day meters so that the alternate rate dials are engaged during the actual peak and off-peak demand intervals for the utility system, so that a variety of rates can be charged to consumers depending on the intervals during which power is used. It is also desirable to have a method and apparatus for easily testing and setting the time in the time-of-day meter so that the accuracy of the time-of-day meter clock can be easily checked and the time setting corrected, if necessary.

In view of the aforementioned, it is an object of this invention to provide a method and apparatus for easily and efficiently programming and testing a time-of-day meter and for setting the time clock of the time-of-day meter.

SUMMARY OF THE INVENTION

In a preferred embodiment of the invention a portable programmer for a time-of-day meter is provided including a seven-day timer which is controlled by a quartz crystal oscillator. A time comparator is driven in synchronism with a signal which drives the clock in the time-of-day meter. When the time of the time comparator is equal to that of the programmer time, a compare signal is generated to switch the timer in the meter to its standard time base. A programmable read-only memory in the portable programmer stores a plurality of different programs, each of which can be selectively read into the time-of-day meter. The output of the programmable read-only memory is read out and compared with the time generated by the time comparator. When a comparison exists, an output is generated to a program comparator which compares the control output of the time-of-day meter with the control output signal from the portable programmer and if a comparison exists, an indication is given indicating that the program has been properly read into the time-of-day meter.

BRIEF DESCRIPTION OF THE DRAWINGS

Other objects, features and advantages of the present invention will become more fully apparent from the following detailed description of the preferred embodiment and the appended drawings in which:

FIGS. 4A and 4B are detailed schematic diagrams of the time comparator of the present invention;

FIGS. 5A and 5B are detailed schematic diagrams of the program circuit of the present invention; and FIGS. 6A and 6B are schematic diagrams of the output control comparator circuits of the present invention.

DETAILED DESCRIPTION OF THE PREFERRED EMBODIMENT

Figure 1:
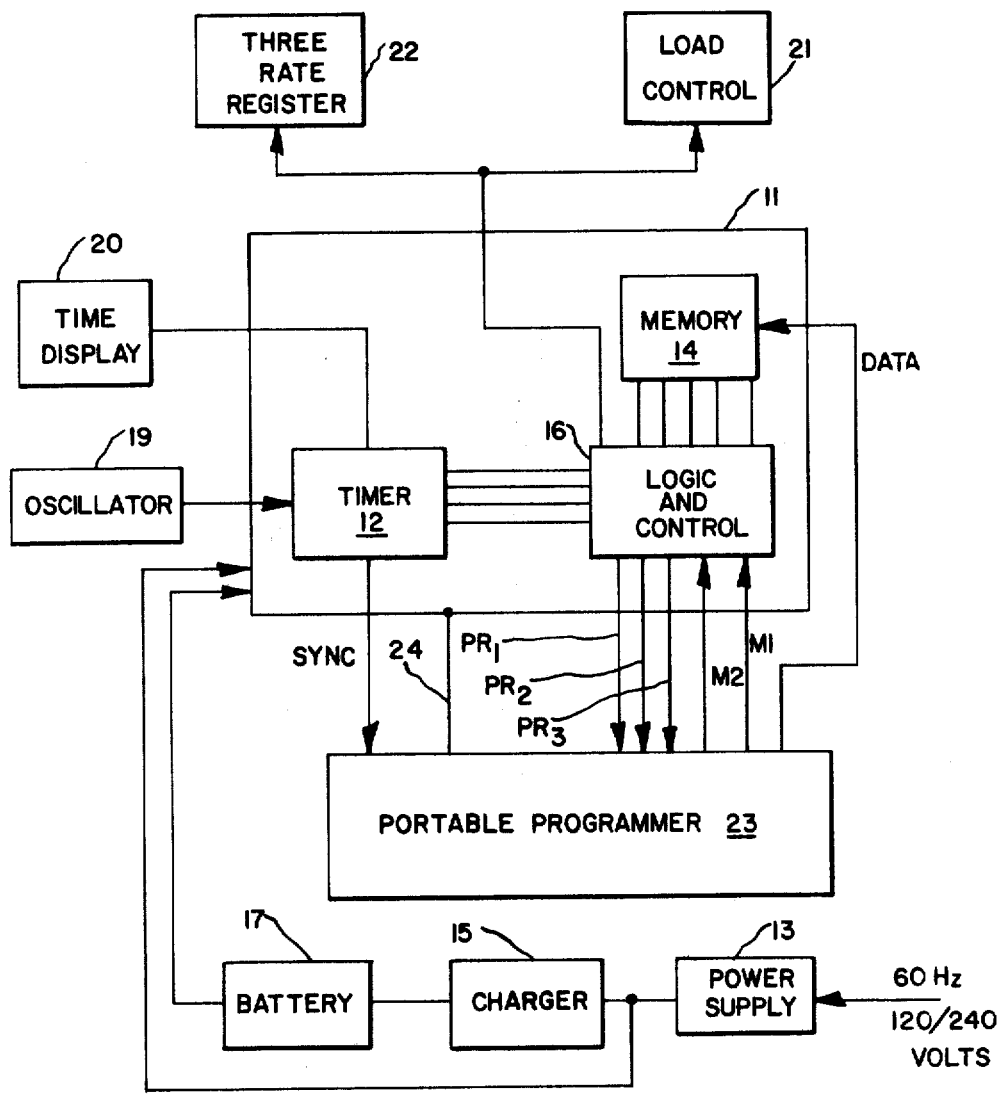
FIG. 1 is a schematic block diagram of a time-of-day metering control circuit such as disclosed in the aforementioned copending U.S. patent application Ser. No. 724,041.

Refer now to FIG. 1 where there is illustrated in schematic block diagram form the time-of-day metering control system which is disclosed in copending U.S. patent application Ser. No. 724,041, filed on even date herewith and assigned to the same assignee herewith. A programmable control circuit generally designated by the numeral 11 is shown which generates control signals for selectively engaging alternate rate sets of decade gear-driven dials which are included in the mechanical portion of the kilowatt hour register 22. Alternate sets of dials in the KWH register 22 accumulate and display the consumption of power at the same rate as a conventional set of dials therein when appropriately actuated by the output from the control circuit 11. When the alternate rate sets of dials are disengaged, they remain fixed at their last reading until again engaged. The purpose of having the two alternate rate sets of dials is to provide utilities with a three-level rate structure, if desired, i.e., total power usage, a first alternate rate usage and a second alternate rate usage. The controller circuit 11 includes a 7-day clock timer 12, a recirculating memory 14 and a logic control circuit 16. The control circuit 11 is energized from the 60 Hz power line via power supply 13. A battery charger 15 is provided which charges a rechargeable battery 17 so that should a power outage occur, the timing function of the programmable controller circuit 11 will continue to be operable. In addition to providing power to the programmable control circuit, the 60 Hz output of the power supply 13 is utilized as a time base for the timer 12. Further, should a power outage occur, a quartz crystal oscillator 19 is provided which will act as an alternate time base for the timer 12. The output of the 7-day clock 12 is resolved into 15 minute intervals with each output being capable of controlling one or more timed functions during any one of the 15 minute intervals. The timer also drives a single digit time display 20.

The control circuit 11 includes a recirculating memory 14 for storing a time code and function code which memory includes a plurality of serial shift registers. The time code stored in the shift registers defines the times at which selected alternate rate registers are to be engaged or disengaged. The function code stored in the shift registers indicate which alternate rate dials are to be engaged or disengaged at any particular time. The outputs of the serial shift registers are connected to a logic and control circuit 16, as is the output of the 7-day clock timer 12. Thus, the contents of the recirculating memory 14 are constantly being compared with the output of the timer 12 and when a comparison exists, an appropriate output device is actuated. Thus, the outputs of the logic circuit 16 provide command signals which cause the alternate rate dials in the register 22 or the load control switch 21 to be actuated to thereby determine the rate at which the consumption of electrical energy will be charged to the customer and devices within the premises which will be operative to utilize the consumed electrical energy.

Because of seasonal changes in the usage of power it is often desirable to vary the program stored in the recirculating memory 14. To do this, the time standard established by the timer 12 must be accurate and a means must be provided for reading a new program into the memory 14. This is accomplished by the portable programmer 23 of the present invention which is capable of reading data into the recirculating memory 14 and for providing control signals M1 and M2 to the control circuit 11 for the purpose of reading new data into the recirculating memory 14, setting the timer 12 and testing the operation of the controller circuit 11. To accomplish this, the time base of the portable programmer must be tied to that of the controller circuit 11 and accordingly, sync signals are derived from the timer circuit 12 for controlling the timing operations of the programmer 23. In addition, the circuitry of the programmer 23 is tied to that of the controller 11 by means of a common line 24.

Figure 2:
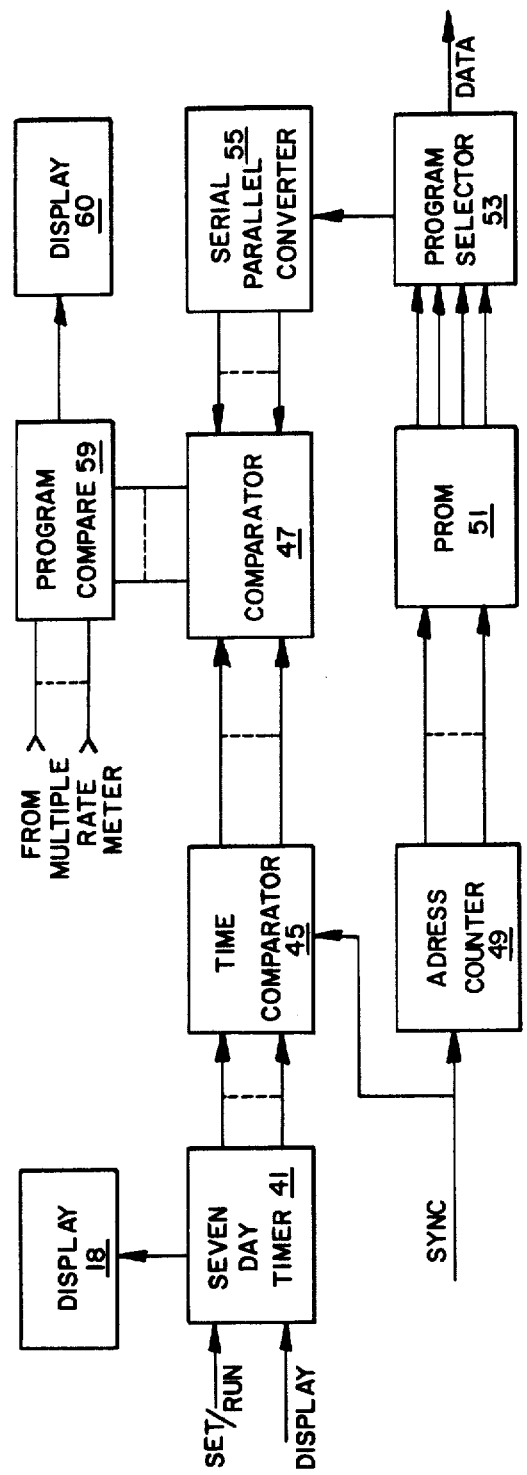
FIG. 2 is a block diagram of the portable programmer of the present invention.

Refer now to FIG. 2 where there is illustrated in schematic block diagram form the preferred embodiment of the portable programmer of the present invention. A 7-day timer is illustrated which is controlled by an internal quartz crystal oscillator. The 7-day timer can be set to any given time of the week and thereafter will advance as a realtime 7-day timer. In order to determine what time is being set into the timer and what time of day or week the timer has generated, a display 18 is provided.

A time comparator circuit 45 includes a timer circuit somewhat similar to that included in the timer circuit 41. However the timer circuit of the time comparator 45 is advanced at a rapid rate in synchronism with the stepping of the timer in the time-of-day meter. This is accomplished by using the same sync signal utilized in the time-of-day meter. When the timer in the time comparator circuit 45 reaches a time established by the timer 41, a compare signal is generated to disengage the sync signal from the timer within the time-of-day meter to thereby permit the time-of-day meter to advance as a 7-day timer. In the meantime, the time comparator provides, in digital form, outputs indicating the day, the hour of the day and four 15 minute intervals within each hour. These signals are coupled to a comparator circuit 47.

In order to provide a new program for the time-of-day meter, an address counter 49 is provided which is driven by the sync signal from the time-of-day meter. The output of the address counter sequentially addresses a programmable read-only memory 51 which is capable of storing up to four different programs. The particular program which is desired to be read into the time-of-day meter is selected by means of a selection circuit 53. After selecting a given program, the program is read from the program read-only memory 51 via the selection circuit 53 into the recirculating memory 14 of the time-of-day meter. After the program has been read into the memory of the meter, a test is performed which includes the following sequence. The program read into the time-of-day meter memory is converted to a parallel signal by means of a serial-to-parallel converter 55. The output of the serial-to-parallel converter is compared by means of comparator 47 with the time-of-day code from the time comparator 45. When a comparison exists, an indication is given that an action such as the engagement or disengagement of one of the alternate rate dials is to take place. Thus, the comparator 47 generates gate enabling signals to a second comparator 59 together with a set of function control signals $P_1$-$P_3$, as will be seen hereinbelow. Comparator 59 compares the command signals $P_1$-$P_3$ generated internally by the portable programmer with the corresponding output signals of the logic circuit 16 which signals control the drive of the three rate register 22 and the load control switch 21. This test sequence is repeated for each 15 minute interval defined by the comparator 45 until the program in the meter has been tested for each 15-minute interval of the week. It will, of course, be understood that since the time base for the times in comparator 45 has a substantially higher frequency than that of a real time clock, the testing sequence is completed in a few seconds. If a comparison exists, an indication is given by display means 60 that a program has been successfully read into the time-of-day meter. In the alternative, if no program is read into the time-of-day meter but rather only a test is conducted, the indicator circuit 60 will provide an indication of whether the meter is operating correctly.

Figure 3A:
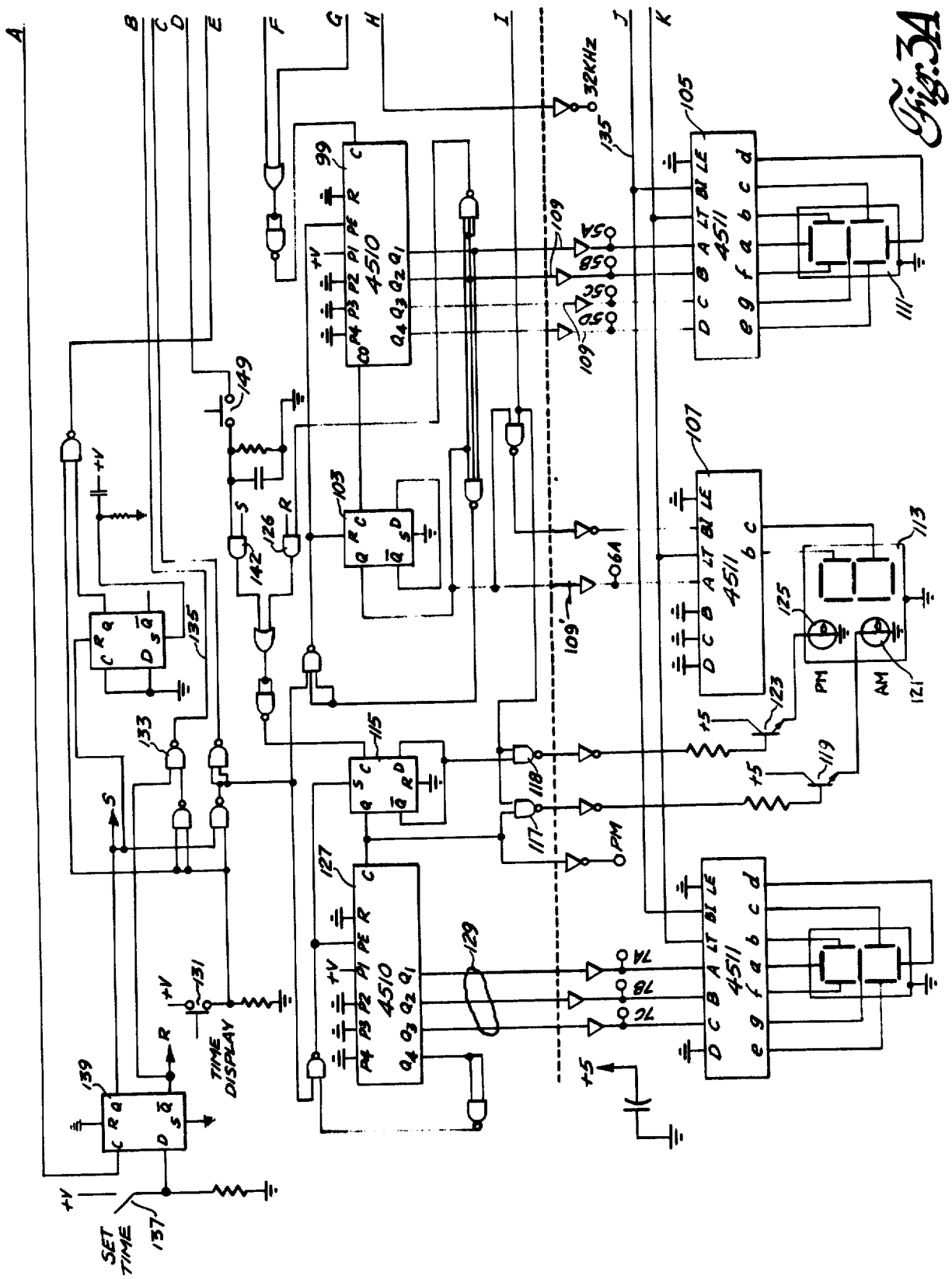
FIG. 3A and 3B are more detailed schematic diagrams of the timer circuit of the present invention.
Figure 3B:
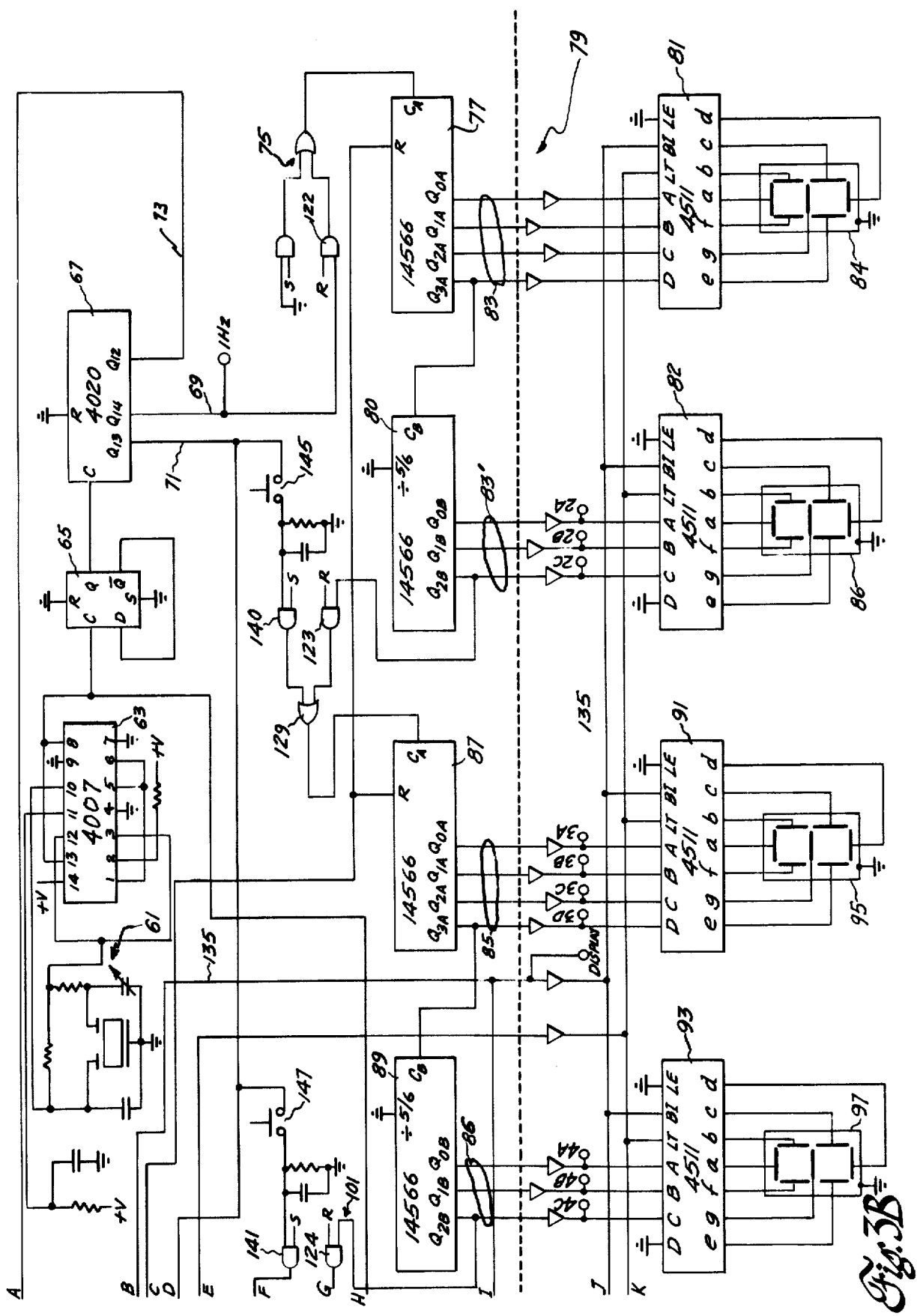

Refer now to FIGS. 3A and 3B for a more detailed description of the timer 41 of the portable programmer of the present invention. A quartz crystal oscillator 61 generates a signal having a frequency of 32,768 Hertz in a manner well known in the art. The output of the quartz crystal oscillator is coupled to a driver circuit 63 of conventional design known in the art. The output of the driver circuit 63 is divided by divider circuit 65 to 16,384 Hertz. This signal is further divided by divider circuit 67 to provide a 1 Hz signal on output line 69, a 2Hz signal on output line 71 and a 4 Hz signal on output line 73. The 1 Hz signal is coupled to gate 75 which is enabled during the normal run operation of the portable programmer. Thus, gate 75 provides a 1 Hz signal to the first stage 77 of the timer counter 79 when the portable programmer timer is in the run state. The most significant binary digit output of divider 77 is connected to the input of the second stage 80 of the timer counter 79. Stage 77 is a divide-by-10 divider, while stage 80 is a divide-by-6 counter. Thus, lines 83 and 83' connect the outputs of stages 77 and 80 to decoder circuits 81 and 82, respectively. The outputs of the decoder circuits 81 and 82 are each connected to a separate seven-segment, single digit displays 84 and 86, respectively. Display devices 84 and 86 are of conventional design known in the art and display seconds.

With the clock running in its normal run mode, the most significant output of stage 80 is coupled via AND gate 123 and OR gate 129 to stage 87 of the timer counter 79. The most significant digit output of divider 87 is connected to the input of divider stage 89 of the timer counter 79. The outputs of these dividers are connected on lines 85 and 86 to decoder circuits 91 and 93. The output of the decoder circuits 91 and 93 are connected to single digit, seven segment display units 95 and 97, respectively. Display units 95 and 97 display the minutes.

During the normal run operation of the timer counter 79, the most significant digit output of stage 89 thereof is connected to stage 99 via gate 101. The carry-over output of divider stage 99 is connected to flip-flop 103. The outputs of the divider stage 99 and flip-flop 103 are connected to decoder circuits 105 and 107 by means of lines 109 and 109', respectively. The outputs of decoders 105 and 107 are connected to display units 111 and 113, respectively. These display units display the hours of the day in 12-hour segments. Since the outputs on lines 109 and 109' only count up to 12, an indication must be provided of which 12-hour segment of the day the clock is presently counting. Thus, when 12 hours have been counted, flip-flop 103 and divider stage 99 are reset and flip-flop 115 is switched. The output of flip-flop 115 is connected to a set of NAND gates 117 and 118. When the counter is counting in the first 12-hour period of a day, the output of NAND gate 117 goes low to thereby turn on driver transistor 119. When this occurs an AM light 121 is energized. In the alternative, when the second 12-hour period of the day begins, the output of NAND gate 118 goes low to thereby drive transistor 123. With transistor 123 conducting current, PM lamp 125 is energized. Thus, the combination of display units 111 and 113 together with the lamps 121 and 125 define each hour in a 24-hour day.

The output of flip-flop 115 is also coupled to divider 127 which provides on output lines 129 BCD signals which indicate in which of the 7 days of the week the clock is currently counting. The specific connections between the respective counters of the timer are not described herein in detail but rather are illustrated since such connections are well known to those of ordinary skill in the art. Further, the specific operation of the decoder driver circuits and the seven segment display elements are of conventional design and accordingly are not described herein in detail.

Under normal operating conditions, the seven segment displays are blanked, i.e., turned off, in order to conserve battery energy for the portable programmer. However, by momentarily depressing the time display switch 131, the numeric indication of the time of day the day of week can be displayed. More specifically, when the time display switch 131 is closed, NAND gate 133 provides an output on line 135 to the decoder driver circuits to enable the display of the time on the seven segment display units.

In order to set the counter, set switch 137 is closed to thereby provide a high signal on line S at the output of set flip-flop 139 which is coupled to one input of AND gates 140, 141 and 142 which are associated with the gates for setting the minutes, hours and day of the timer, respectively. At the same time, the low signal on line R at the $\overline{Q}$ output of flip-flop 139 is coupled to AND gates 122, 123, 124 and 126 to inhibit these gates to thereby prevent normal operation of the counter circuit 79. When a predetermined value for minutes is to be set into the timer counter 79, switch 145 is closed to thereby couple a 2 Hz signal to the input of counter 87 via AND gate 140 and OR gate 129. Thus the minute count in the timer counter circuit 79 is advanced at a 2 Hz rate. When the proper minute level is reached, switch 145 is released. To set the hours in the clock timer the switch 147 is closed to thereby permit the 2 Hz signal to be coupled to counter 99 via gate 141. When the hour count of the counter circuit 79 has reached the desired level, the hour set switch 147 is released. Finally when a predetermined day and portion thereof are to be set into the clock, switch 149 is closed to thereby couple the 2 Hz signal via AND gate 142 to the input of flip-flop 115. The flip-flop 115 steps forward two counts each second until the proper numerical value for the day is displayed together with the proper portion of the day, i.e., the AM or PM. When the appropriate time of day has been set into the clock, the set day switch 149 is opened and the set switch 137 is opened so that the clock can then advance in its normal course under the control of the quartz crystal oscillator 61.

Refer now to FIGS. 4A and 4B which are more detailed schematic illustrations of the time comparator circuit 45 of the present invention. At input gate 151 a 16 kHz sync signal $\overline{SYNC}$ derived from the time-of-day metering system is coupled to establish a time base for a clock circuit generally designated by the numeral 153. The 16 kHz sync signal is coupled to a divider circuit 155, the output of which is coupled to a second divider 157 when the INHIBIT input is low. The output of divider 157 is a 1.6 kHz signal. This signal is coupled to a comparator in the form of an EXCLUSIVE OR gate 159. The seconds signal output of divider 80 at terminals 2A, 2B and 2C of the timer FIG. 3B is coupled to a logic circuit 161 which changes the state of its output twice every minute. Thus, comparator 159 provides an output which indicates the time coincidence of the half minute output of the timer of FIGS. 3A and 3B and the output of divider 157.

The output of divider 157 is coupled to divider 163 which provides in its output in BCD format, signals corresponding to the units digit position of the minutes of the hour. The most significant binary digit output of divider 163 is coupled to a divider 165 which provides at its output in BCD format signals corresponding to the tens digit position of the minutes of the hour. The most significant digit output position of the divider 165 is coupled to a divider 167 which provides output signals corresponding to the units digit position of the hours of the day. The carry-over output of divider 167 is coupled to a divide-by-two circuit 169, the output of which corresponds to the tens digit position of the hours of the day. When the count at the output of dividers 167 and 169 reaches 12, a logic circuit 171 generates a high output signal to flip-flop 173. The output of flip-flop 173 indicates which portion of the day, i.e., the AM or PM, the clock is counting in. The output of flip-flop 173 is coupled to a divider 175 which generates output signals corresponding to the day of the week.

The clock circuit 153 corresponds substantially to that illustrated in FIGS. 3A and 3B. However, it operates at a rapid rate compared to the clock of FIGS. 3A and 3B so that the timer of FIGS. 4A and 4B can be rapidly stepped into time coincidence with the timer 41 illustrated in FIGS. 3A and 3B. To determine time coincidence, a series of comparators including comparator 159 are coupled to the outputs of each of the dividers 157, 163, 165, 167, 169, 173 and 175. These comparators compare the BCD real time output of the dividers of the counter circuit illustrated in FIGS. 3A and 3B with the BCD fast time output of the counter circuit 153. When a time coincidence occurs, i.e., the time generated by the counter 79 of FIGS. 3A and 3B is the same as the time generated by the clock circuit 153 of FIG. 4, a compare signal COMP is generated at output terminal 177. Since the clock timer in the time-of-day metering system started from the same reference point and since the timer in the time-of-day metering system was stepped at the same rate as the timer of FIG. 4, when a compare signal is generated at output 177, the time of the clock timer in the time of day metering system is identical to the time preset into the timer 41 of the portable programmer. Thus the compare signal, as will be seen hereinbelow, is utilized to switch the time base in the time-of-day metering system to real time once the comparison is established. The comparison circuit is enabled by means of a NAND gate 179 to which is coupled a sync signal SYNC derived from the time-of-day metering system and an enabling signal SET II which is generated by the program control circuit of FIGS. 6A and 6B in a manner which will be set forth more fully hereinbelow. Thus the comparison circuit functions only during the SET II mode of the programmer.

The BCD outputs of the counter timer 153 are converted to binary signals for the comparison circuit 47 illustrated in FIG. 2. The outputs of counters 163 and 165 which correspond to the minutes of the hour are converted by logic circuit 181 to a quarter-hour signal QC at the output of NAND gate 183. Thus the output of NAND gae 183 changes its state in what corresponds to 15 minute time segments with this output being coupled to the data input of a flip-flop 185. Flip-flop 185, which is gated by a SYNC signal derived from the time-of-day metering system, provides a QCS output which is utilized to reset the address counter 49 illustrated in FIG. 2. In addition, this output signal is coupled to a divider circuit 187 which provides outputs $Q_1$ and $Q_2$ which correspond to four 15-minute time segments in a day. It is, of course, understood that since the clock circuit 153 is being driven at a much higher rate than a conventional real time clock, the outputs $Q_1$ and $Q_2$ generate signals for defining time periods which are substantially less than 15 minutes but which correspond to 15-minute intervals. A logic circuitry 186 generates signals corresponding to the hours of the day, i.e., $H_1$–$H_4$. Finally, at output 188 a signal A/P is generated which corresponds to the AM or PM 12-hour segment of a day and at the outputs 189 signals D1–D3 are generated which correspond to the day of the week.

Refer now to FIGS. 5A and 5B where there is illustrated, among other things, in detailed schematic form the address counter 49, programmable memory 51 and comparator circuit 47 of the present invention. When a program is to be read into the time-of-day metering system, a program command signal PROG generated by the program control circuit of FIG. 6A and 6B when the programmer is in the program mode is coupled to one input of gate 201 to enable this gate. The 16 kHz sync signal SYNC derived from the time-of-day metering system is coupled to the other input of this gate and is coupled through NAND gate 203 to the address counter 49. The address counter is of conventional design known in the art and provides in sequential fashion a series of address signals. These signals are coupled to a programmable read-only memory 51 of conventional design known in the art via buffer amplifiers 205. The programmable read-only memory has a capacity for storing four meter programs, any one of which can be selected by means of the programmer selector switch 53 to be read into the shift register storage of the time-of-day metering system.

In operation, the 16 kHz sync signal SYNC drives the address counter 49 to select in sequence the address locations of four programs stored in the PROM 51. Depending upon the position of selector switch 53, one of the programs is read out in sequential fashion through gating circuit 207 and inverter 209 to the data input of the recirculating storage of the time-of-day meter.

An important feature of the present invention is to provide a means for comparing the operation of the meter in accordance with the program read therein with the output of a circuit in the programmer which simulates the controller logic circuit of the meter. To achieve this, testing circuitry which simulates the circulating memory and logic circuitry of the time-of-day metering system is provided. Thus, 10 serial shift registers 210–219 are provided into which the contents of the stored program is written in sequential order. The operation of the meter is tested for what corresponds to each 15-minute interval of the week. Accordingly, the program is repeatedly written into the shift registers 210–219 which simulate the storage of the meter. Since the program is operating on a 16 kHz time base, the repeated testing for what corresponds to each 15 minute interval is completed in a very short time. However, in order to read the contents of the PROM 51 and control the comparing sequence, i.e., testing operations, once each 15-minute interval defined by the signal QCS of FIG. 4B, a 32 kHz signal from FIG. 3A is coupled to NAND gate 202. NAND gate 202 is enabled and NAND gate 201 inhibited when the programmer changes from the program mode to the SET I mode. Thus address counter 49 is advanced at a 32 kHz rate.

The output of the address counter 49 is coupled to a decoding circuit generally designated by the numeral 221. The decoding circuit 221 generates a first START COMPARE signal after 157 bits have been read out of the PROM 51 and written into the serial shift registers 210–219. The total number of bits in the program is 168 with 12 of the bits being parity bits. Thus of the first 156 bits sequentially written into the shift registers 210–219, the first 12 bits are parity bits, the next 36 bits are function control bits, the next 36 bits relate to the day of the week, the next 12 bits relate to the 12-hour segment of the day, i.e., AM or PM, the next 48 bits relate to the hour of the day and final 12 bits relate to the 15-minute segments of the hour. With 156 bits read into the shift registers 210–219, only 12 more bits are to be read out of the PROM 51, which bits relate to the 15-minute segment of the hour. Thus, as each remaining bit from bit 157 up to bit 168 are written into the shift registers 210–219, one of 12 time intervals are defined during which a predetermined control function occurs. Thus, when bit 157, i.e., count 157 from counter 49 occurs, AND gate 223 generates an output which is coupled to JK flip-flop 225. The Q output of flip-flop 225 which is high is coupled to NAND gate 227 which is enabled when the SET I signal and the 32 kHz signals are coupled thereto. The output signal from NAND gate 227 is advanced by circuit 229 and is utilized to remove the inhibit of comparator gates 231 and 232 by strobing these gates at a 32 kHz rate.

During the next 12 counts of the 32 kHz signal, data is clocked through the shift registers 210–219 at a 32 kHz rate and is compared with the $Q_1$, $Q_2$, $H_1$–$H_4$, A/P, and $D_1$–$D_3$ signals from the comparison timer circuit of FIGS. 4A and 4B by means of the EXCLUSIVE OR comparator gates 233–242. When a comparison exists, gates 231 and 232 provide a high output designated TIME COMP and DAY COMP, respectively, to indicate that the day of the week and the time of day of the program code coincides with the time output of the comparison timer circuit of FIGS. 4A and 4B. The function control digits of the program are at the same time coupled to an AND-OR gate circuit 245 which is appropriately switched by means of flip-flop 247 to compensate for the fact that there is a two-pulse period delay in processing the corresponding function control pulses in the time-of-day meter. In the meter the function control pulses are each delayed in their respective storage locations by two stages or counts so that in processing the output function control pulses from storage, the resulting command signals $PR_1$, $PR_2$ and $PR_3$ will be generated in time coincidence with the time code signals. Thus the function control signals stored in shift register stages 109–143 are delayed two stages so that when the comparison step starts, the $P_1$ function control signal is in stage 119 in shift register 217, the $P_2$ signal is in stage 131, i.e., the last stage of shift register 217 and the $P_3$ function control signal is in stage 143 in shift register 218. In order to couple these signals to the comparator circuit 59 which is illustrated in detail in FIGS. 6A and 6B, circuit 245 is controlled by high signal $K_b$ to receive the signals at inputs $B_1$, $B_2$ and $B_3$.

After ten more bits have been read out of the PROM 51 and into the shift registers 210–219, i.e., at the count of 167, AND gate 246 provides a high signal to the J input of flip-flop 247. Thus, circuit 245 is switched to receive the signals at the $A_1$, $A_2$ and $A_3$ inputs. At this time the 11th $P_1$ function control signal is at stage 131, the 11th $P_2$ signal is at stage 143 in shift register 218 and the 11th $P_3$ signal is at stage 155 in shift register 219. After two more bits have been read out of the PROM 51 and into the shift registers 210–219, An END COMPARE signal is generated at the output of AND gate 222. This signal in effect resets flip-flop 225. Thus, the comparison is inhibited. After the address counter counts through to 255, a strobe signal is generated by NAND gate 249. The outputs of NAND gate 249 and circuit 245, together with the DAY COMP and TIME COMP signals are coupled to appropriate inputs of the comparison circuit 59 which is illustrated in detail in FIGS. 6A and 6B.

After each time period corresponding to 15 minutes of real time, a signal QCS is generated by the timer of FIG. 4B for resetting the address counter 49 and the flip-flops 225 and 247. When the operation of the meter has been tested for each 15-minute time segment of the week, the SET I signal from the sequence control circuit of FIGS. 6A and 6B goes low to inhibit further operation of the circuit. A reset pulse RST is also generated by the sequence control circuit of FIGS. 6A and 6B for resetting the address counter 49 and the flip-flops 225 and 247.

Refer now to FIGS. 6A and 6B where there is disclosed the sequence control circuit of the present invention. The control function signals at the output of circuit 245, i.e., P1SR, P2SR and P3SR, are coupled to flip-flops 251, 252 and 253, respectively. Each of these flip-flops serves as gates which are enabled by the DAY COMP signal at the output of gate 232 of FIG. 5A and B. The DAY COMP signal is coupled to the clock input of each of the flip-flops 251–253. The outputs of the flip-flops 251–253 are coupled to a logic circuit generally designated by the numeral 255 which serves to generate three function command signals which correspond to the function control signals generated by the corresponding logic circuit in the time-of-day metering system. These signals are coupled to a second set of flip-flops 256, 257 and 258 which serve as function control flip-flops. The TIME COMP signal from gate 231 of FIGS. 5A and B is coupled to the clock input of each of the flip-flops 256–258 so that the signal at the data input thereof is coupled to the Q output thereof. These function control signals are then coupled to a comparator circuit 259 which is in the form of three parallel EXCLUSIVE OR gates. At the same time the corresponding control function signals $PR_1$, $PR_2$ and $PR_3$ generated by the time-of-day metering system are coupled via amplifiers 261 to a latch circuit 263. The outputs of the latch circuit 263 are then coupled to the comparator 259. A comparison step is taken when a strobe signal is coupled to gate 265 from the strobe gate 249 of FIG. 5A and B. If a comparison does not exist, latch circuit 263 will be reset thereby causing its $Q_1$ output to go low. This, in turn, turns off transistor 351 and turns on transistor 357. With transistor 357 turned on, the fail indicator light 359 is energized to indicate that the program was not properly written into the memory of the time-of-day metering system. Should a comparison be made, the $Q_1$ output of latch circuit 263 remains high to thereby energize the test completed successfully indicator lamp 353.

The sequence control circuitry for the portable programmer and the meter will now be discussed. Illustrated in FIG. 6B are the mechanically operated program, test and set time switches 275, 277 and 279, respectively. If, for example, a new program is to be read into the metering system the program switch 275 and test switch 277 are closed. If the metering system is to be only tested, only the test switch 277 is closed and if only the time in the meter is to be set, the set time switch 279 is closed. Assume, for example, that the time in the metering system is to be set, set time switch 279 is closed to thereby cause the Q output of flip-flop 296 to go high. This high signal is coupled to one input of NAND gate 292 and to one input of NAND gate 294. At the same time the $\overline{Q}$ output of flip-flop 296 goes low thereby causing the output of NAND gate 295 to go high. This high signal is coupled to the data input of flip-flop 297 which provides a low signal at the $\overline{Q}$ output thereof. This signal removes the reset from counter 299 and at the same time enables NOR gate 301. NOR gate 301 enables a 1 Hz signal to be coupled to the clock input of the counter 299. The $Q_1$ output signal is coupled from the counter 299 to a latch circuit 303. This latch circuit 303 had previously had its reset removed by the low signal at the $\overline{Q}$ output of flip-flop 297. The latch circuit 303 provides a low output signal which removes the reset from counter 305. When this occurs a 16 KHz signal is coupled to the clock input thereof. The counter circuit 305 then provides a delayed output to the NAND gates 307 and 294, respectively, for enabling these gates after a predetermined period of time.

The counter 299 provides a second output at terminal Q5 after a 16 second delay. Thus, NAND gate 292 provides a low output which is inverted by NAND gate 309 and coupled to the data input of flip-flop 311. Flip-flop 311 provides at its $\overline{Q}$ output a low going signal which is coupled to NAND gate 313, inverted thereby and coupled to the reset input of flip-flop 296 to reset the flip-flop 16 seconds after the set time switch had been closed.

With NAND gate 294 enabled by the output of counter 305, the high output of flip-flop 296 is inverted by NAND gate 294 and coupled to NAND gates 313, 314 and 315. In response thereto, each of these gates provides a high output to the J input of JK flip-flops 317, 319 and 321. The flip-flops 317, 319 and 321 each provides at their Q outputs a high signal. The Q outputs of flip-flops 317 and 319 are inverted and coupled to the M1 and M2 output terminals, respectively. Thus, after the set time switch 279 is closed the M1 and M2 outputs both go to logical zeros to thereby cause the program control circuit of the meter to go into the reset mode. When in this mode, the NOR gate 323 provides a high output to flip-flop 325. Flip-flop 325 accordingly provides a low signal at its $\overline{Q}$ output which signal is coupled to counter 327 to remove the reset therefrom. Counter 327 then counts the 16 kHz SYNC signal coupled thereto and after a first delay period corresponding to a count of 3, an output is provided at the "3" terminal for resetting the circuits of the programmer. After a further delay of four more counts, the "7" output terminal of counter 327 provides a high signal which is coupled to the K input of flip-flop 319. Accordingly, the output at terminal M2 goes high to thereby cause the programmable controller to be in the set mode. At the same time the $\overline{Q}$ output of flip-flop 319 goes high so that NOR gate 329 provides a high signal at the output thereof. This signal is coupled to flip-flop 331 and accordingly the $\overline{Q}$ output thereof goes low. This low signal is coupled to the set input of flip-flop 333. The flip-flop 333 is reset when a comparison signal COMP is generated at output terminal 177 of FIG. 4A. This indicates that the set time operation of the portable programmer has been completed. At this time the flip-flop 333 generates a high signal at output terminal $\overline{Q}$ which signal is coupled to the K input of flip-flops 317 and 321. Flip-flop 317 therefore generates a high signal at its Q output which is inverted and coupled to the M1 terminal. Accordingly, since the M1 and M2 terminals both contain high signals the meter is caused to return to its normal run mode.

When this occurs the output of NOR gate 335 goes high to thereby turn off transistor 337. With transistor 337 turned off the run indicator lamp 339 is turned off. At the same time the high output of the NOR gate 335 is coupled to one input of NAND gate 341. The other input to NAND gate 341 is derived from the output of latch circuit 303 via inverter 343. Accordingly, the output of NAND gate 341 is low. This low signal is coupled to one input terminal of NOR gates 345 and 347. The other input to NOR gate 347 is derived from the last stage of the counter 305. Thus, when a $\overline{\text{SYNC}}$ signal is appropriately coupled to the counter 305 from the metering system, a high output signal is generated at output terminal "9" to indicate the completion of a countthrough in the counter 305. This signal is inverted and coupled to NOR gate 347. In response thereto NOR gate 347 provides a high output signal which is coupled to NAND gate 349. It will be recalled that the other input to NAND gate 349 is derived from a $Q_1$ output of latch circuit 263. Thus, when the output of latch circuit 263 indicates that a proper operation of the metering system exists a high signal is coupled to NAND gate 349. Accordingly, the output of NAND gate 349 goes low to thereby turn on transistor 351 and hence energize the COMPLETE lamp 353. At the same time, the low output of NAND gate 349 is coupled to one input of NAND gate 355. The output of NAND gate 355 accordingly goes high. This signal is inverted and coupled to the base of transistor 357. Transistor 357 is accordingly opened to thereby de-energize FAIL lamp 359. After a predetermined period of time when the latch circuit 303 is reset, a reset signal is generated which is coupled to NAND gate 341. The output of NAND gate 341 therefore goes high. Thus, the output of NOR gate 345 and 347 go low. These low signals are coupled via NAND gate 355 and 349, respectively, to transistors 357 and 351, respectively. In turn, these transistors are turned off. Thus, at the end of a cycle of operation, energy to the lamps 353 and 359 is shut off.

Now assume that a test operation is to be performed. When this occurs switch 277 is closed and accordingly a high signal occurs at the Q output of flip-flop 283. This signal is coupled to one input of NAND gate 363. The other input to NAND gate 363 is derived from the Q6 output of counter 299. After a 32 second time delay established by the counter 299, NAND gate 363 generates a low output which is inverted by NAND gate 309 and coupled to the data input of flip-flop 311. Flip-flop 311 provides at its Q output a high signal which resets the flip-flop 283 to thereby remove the test command signal from the portable programmer after a 32 second period of time. At the same time the $\overline{Q}$ output of flip-flop 311 is inverted to reset flip-flop 296.

The output of flip-flop 283 is also coupled to one input of NAND gate 307 with the other input thereto being derived from the "4" output terminal of counter 305. When counter 305 provides a high output to the NAND gate 307, the output thereof goes low. This low signal is inverted by inverter 365 and coupled to one input of NAND gates 367 and 369. NAND gate 369 provides a high signal to the other input of NAND gate 367. Thus, the output of NAND gate 367 is low with this signal being coupled to one input of NAND gates 314 and 315. NAND gate 315 provides a high output to JK flip-flop 317 while NAND gate 314 provides a high output to JK flip-flop 319. Thus, each of these flip-flops provide at their Q output high signals which are inverted and coupled to the M1 and M2 output terminals respectively. Thus, the output terminals are low thereby causing the meter system to be in the reset mode.

As aforementioned NOR gate 323 provides an output to flip-flop 325 which in turn removes the reset from counter 327. Counter 327 thus provides at its "7" output, after a 7 count time delay, a high signal to the K input of flip-flop 319. When this occurs the Q output of flip-flop 319 goes low thereby causing the M2 output to go high. Thus, with the M1 output low and the M2 output high the system is returned to the set mode. At the same time, the Q output of flip-flop 321 is low and accordingly, the SET I output of NOR gate 371 goes high. This signal is inverted by inverter 373 to thereby remove the reset from counter 375. The clock input to the counter 375 is a signal which corresponds to a day pulse. Thus, the A/P output of the timing circuit of FIG. 4A, which goes high once a day, can be utilized. However, this signal must be appropriately synchronized and accordingly the A/P pulse is coupled to one input of a gate with the other input thereto being derived from the SYNC signal. Thus, the input signal DC to the counter 375 is an appropriately synchronized signal which occurs once each day.

After counter 375 has counted to 2 which corresponds to the second day in the timer circuit of the portable programmer timer of FIGS. 4A and 4B, a pulse is generated which is coupled to NOR gate 377. The output of NOR gate 377 sets the first stage of the latch circuit 263. After seven more counts corresponding to 7 days, the "9" output of counter 375 generates a high signal which is inverted by inverter 379 and coupled to one input of NAND gate 313 and one input of NAND gate 314. With the outputs of NAND gates 313 and 314 high, flip-flop 319 provides a high output which is inverted to drive the M2 output low. Accordingly, the system is now in the reset mode with NOR gate 323 providing a high output. At this point the programmer operates in the same manner as it would had the set time switch 279 been closed. At the completion of a cycle NOR gate 335 generates an output for turning off the RUN lamp 339 and appropriately energizing one of the lamps 353 or 359 to indicate whether the test has been completed successfully or whether there is a failure in the system.

Assume now that it is desired to reprogram the metering system. To do this, switch 275 is closed together with test switch 277. In response a high signal is coupled to NAND gate 369 together with a high signal derived from a Q output of flip-flop 283 via NAND gate 307 and inverter 365. In response the output of NAND gate 369 goes low and the output of NAND gate 367 goes high. Thus, NAND gate 314 provides a high signal at its output which is coupled to flip-flop 319. At the same time, the high output signal of NAND gate 367 is coupled to NAND gate 315. Since each of the inputs to NAND gate 315 are high, the output thereof is low. Thus, flip-flop 317 remains in the reset state with a low Q output which is inverted to cause the M1 output of the programmer to remain high. The flip-flop 319 provides a high output at its Q terminal which signal is inverted to thereby cause the M2 output of the programmer to go low. Thus, with M1 high and M2 low the system is in the program mode. When this occurs, the output of NOR gate 381 goes high to thereby generate the program signal PROG which is coupled to the program address circuit of FIG. 5A and B to initiate the writing of a new program into the memory of the metering system. After the program has been read into the metering system, a program complete signal END PROG is generated by the circuitry of FIG. 5A and B which signal is coupled to NAND gate 315. Since this signal is low, the output of NAND gate 315 goes high. Thus, flip-flop 317 provides a high signal at its Q output which signal is inverted and coupled to the M1 output of the programmer. Thus, M1 goes low, and since M1 and M2 are both now low, the system is in the reset mode. With the system in the reset mode NOR gate 323 generates a high output signal to thereby remove the reset from counter 327. The programmer circuit of FIGS. 6A and 6B then recycles in succession into the RESET, SET I, RESET, SET II and back to the normal run states in the same manner as when the test switch alone was closed.

Accordingly, it can be seen that the sequence control circuit of FIGS. 6A and 6B generates control signals M1 and M2 which are coupled to the metering system for placing the metering system in the normal run, set, program or reset modes of operation. In addition during any one of these operations the sequence control circuit generates internal PROG, SET I, SET II and RESET control signals for controlling the internal operation of the portable programmer of the present invention. This is always accomplished in the ordered sequence described, in order to insure that the metering system is properly operating and that the time therein is appropriately set.

Advantageously, if conservation of power is desired, a PSON signal is generated by NOR gate 385 when either the test or set time switches 277 and 279, respectively, are closed, or when the display switch 131 of FIG. 3A is closed. This signal activates a power supply to provide power to appropriate circuitry of the portable programmer. However, in order to provide for a means of initiating the operation of the power supply, i.e., by the PSON signal, the circuit within the dotted line 387 and the timer 41 are always energized by means of a battery.

while the present invention has been disclosed in connection with the preferred embodiment thereof, it should be appreciated that there may be other alternate embodiments which fall within the spirit and scope of the invention as defined by the appended claims.

What I claim as new and desire to secure by Letters Patent of the United States is:

1. A portable programmer for programming a multiple rate electrical energy meter of the type including a first mechanical register for continuously registering the consumption of electrical energy, at least one alternate mechanical register for registering the consumption of electrical energy during preselected time intervals, a sync signal generator for generating a sync signal, a controllable clock for generating signals normally representative of real time, a recirculating storage for storing time data signals representative of a plurality of predetermined times and for storing function data signals representative of control functions to be performed at said predetermined times, a comparator for periodically comparing the signals from said clock with the time data signals, logic circuitry responsive to an output of said comparator and to the function data signals from said recirculating storage for generating at least one function control signal in accordance with the function data signals when a comparison exists between said time data signals and the signals from said clock, and means responsive to said at least one function control signal from said logic circuitry for engaging or disengaging said at least one alternate register in accordance with said at least one function control signal, said portable programmer comprising:

(a) first clock means, operating at a specified frequency, for generating real time signals;

(b) means responsive to said real time signals for displaying real time;

(c) means for setting said first clock means to a predetermined real time;

(d) second clock means for generating high frequency clock signals, said second clock means being stepped by said sync signal from said multiple rate meter at a substantially greater frequency than the operating frequency of said first clock means;

(e) means for comparing the real time signals and the high frequency clock signals from said first and second clock means respectively; and (f) means for inhibiting the operation of said controllable clock in said multiple rate meter when a comparison exists between said real time signals and said high frequency clock signals.

2. The portable programmer of claim 1 further comprising:

means for storing at least one set of time data signals corresponding to a plurality of predetermined times and for storing at least one set of function data signals corresponding to control functions to be performed at said predetermined times, means for reading out said data signals in sequence into said recirculating storage of said multiple rate meter, circuit means for simulating the operation of said multiple rate meter, and means for comparing the operation of said multiple rate meter having said data signals stored therein with the operation of said simulating circuit of said programmer.

3. The portable programmer of claim 1 further comprising:

means for storing a plurality of sets of time data signals, each corresponding to a plurality of predetermined times and for storing a plurality of function data signals each corresponding to control functions to be performed at said predetermined times, means for selecting one of said sets of data signals, means responsive to said sync signal of said multiple rate meter for reading out said data signals in sequence into said recirculating storage of said multiple rate meter.

4. The portable programmer of claim 3 further comprising means responsive to said high frequency clock signals from said second clock means for deriving time data for selective comparison with the sets of time data signals from said means for storing said sets of time data signals, first comparator means for comparing said time data and selected time data signals from said means for storing said sets, logic circuitry means responsive to the output of said first comparator means and to selected function data signals from said means for storing said sets for generating a function control simulation signal in accordance with said selected function data signals when a comparison of said time data and said selected time data signals exists, and second comparator means for comparing said function control simulation signal with said at least one function control signal generated by said multiple rate meter after said time data signals and said function data signals are read into said recirculating storage of said multiple rate meter.

5. A method of using a portable programmer for programming a multiple rate electrical energy meter of the type including a first mechanical register for continuously registering the consumption of electrical energy, at least one alternate mechanical register for registering the consumption of electrical energy during preselected time intervals, a sync signal generator for generating a sync signal, a controllable clock for generating signals normally representative of real time, a recirculating storage for storing time data signals representative of a plurality of predetermined times and for storing function data signals representative of control functions to be performed at said predetermined times, a comparator for periodically comparing the signals from said clock with the time data signals, logic circuitry responsive to an output of said comparator and to the function data signals from said recirculating storage for generating at least one function control signal in accordance with the function data signals when a comparison exists between said time data signals and the signals from said clock, and means responsive to said at least one function control signal from said logic circuitry for engaging or disengaging said at least one alternate register in accordance with said at least one function control signal, said method of programming said multiple rate meter comprising the steps of:

(a) generating real time signals by a first clock operating at a specified frequency;

(b) displaying, in response to said real time signals, the time of day;

(c) setting said first clock to a predetermined real time;

(d) generating high frequency clock signals by a second clock in response to the sync signal from said multiple rate meter, said sync signal being of a substantially greater frequency than the operating frequency of said first clock;

(f) comparing the real time signals and the high frequency clock signals from said first and second clocks respectively; and (g) inhibiting the operation of the controllable clock in said multiple rate meter when a comparison exists between said real time signals and said high frequency clock signals.

6. The method of claim 5 further comprising the steps of, storing in said portable programmer at least one set of time data signals representative of a plurality of times and at least one set of function data signals corresponding to control functions to be performed at said predetermined times, reading said time data signals and said function data signals from said portable programmer into the recirculating storage of said multiple rate meter, simulating in said portable programmer the operation of said multiple rate meter, and comparing the operation of said multiple rate meter having the sets of time data signals and function data signals stored therein with the operation simulated in said portable programmer.

7. A portable programmer for programming a multiple rate electrical energy meter of the type including a first mechanical register for continuously registering the consumption of electrical energy, at least one alternate mechanical register for registering the consumption of electrical energy during preselected time intervals, a sync signal generator for generating a sync signal, a controllable clock for generating signals normally representative of real time, a recirculating storage for storing time data signals representative of a plurality of predetermined times and for storing function data signals representative of control functions to be performed at said predetermined times, a comparator for periodically comparing the signals from said clock with the time data signals, logic circuitry means responsive to an output of said comparator and to the function data signals from said recirculating storage for generating at least one function control signal in accordance with the function data signals when a comparison exists between said time data signals and the signals from said clock, and means responsive to said at least one function control signal from said logic circuitry for engaging or disengaging said at least one alternate register in accordance with said at least one function control signal, said portable programmer comprising:

first clock means operating at a specified frequency for generating real time signals;

means responsive to said real time signals for displaying real time;

means for setting said first clock means to a predetermined real time;

second clock means for generating high frequency clock signals, said second clock means being stepped by said sync signal from said multiple rate meter at a substantially greater frequency than the operating frequency of said first clock means;

means for comparing the real time signals and the high frequency clock signals from said first and second clock means, respectively;

means for inhibiting the operation of said controllable clock in said multiple rate meter when a comparison exists between said real time signals and said high frequency clock signals;

means for storing a plurality of sets of time data signals, each corresponding to a plurality of predetermined times and for storing a plurality of function data signals each corresponding to control functions to be performed at said predetermined times;

address counter means for sequentially accessing each of said time and function data signals in said storage means;

gating means connected to said storage means for selectively enabling the passage therethrough of a selected set of time data signals and a selected set of function data signals; and means connected to said gating means for reading out said data signals in sequence into said recirculating storage of said multiple rate meter.

8. A portable programmer of claim 7 further comprising circuit means for simulating the operation of said multiple rate meter, said circuit means including:

a serial shift register means for sequentially advancing said data signals therethrough;

means for clocking said data signals through said shift register;

means responsive to said high frequency clock signals from said second clock means for deriving time data;

means for comparing said derived time data with said time data signals in said shift register means;

logic circuitry means responsive to the output of said means for comparing said derived time data with said time data signals and to said function data signals in said serial shift register means for generating a function control simulation signal in accordance with said function data signals when a comparison of said derived time data and said selected time data signals exists; and program comparator means for comparing said function control simulation signal with said at least one function control signal generated by said multiple rate meter after said time data signals and said function data signals are read into said recirculating storage of said multiple rate meter.

9. A portable programmer for programming a multiple rate electrical energy meter of the type including a first mechanical register for continuously registering the consumption of electrical energy, at least one alternate mechanical register for registering the consumption of electrical energy during preselected time intervals, a sync signal generator for generating a sync signal, a controllable clock for generating signals normally representative of real time, a recirculating storage for storing time data signals representative of a plurality of predetermined times and for storing function data signals representative of control functions to be performed at said predetermined times, a comparator for periodically comparing the signals from said clock with the time data signals, logic circuitry responsive to an output of said comparator and to the function data signals from said recirculating storage for generating at least one function control signal in accordance with the function data signals when a comparison exists between said time data signals and the signals from said clock, and means responsive to said at least one function control signal from said logic circuitry for engaging or disengaging said at least one alternate register in accordance with said at least one function control signal, said portable programmer comprising:

first clock means operating at a predetermined frequency for generating real time signals;

means responsive to said real time signals for displaying real time;

means for setting said first clock means to a predetermined real time;

second clock means for generating high frequency clock signals, said second clock means being stepped by said sync signal from said multiple rate meter at a substantially greater frequency than the operating frequency of said first clock means;

means for comparing the real time signals and the high frequency clock signals from said first and second clock means, respectively;

means for inhibiting the operation of said controllable clock in said multiple rate meter when a comparison exists between said real time signals and said high frequency clock signals;

means for storing a plurality of time data signals, each corresponding to a plurality of predetermined times and for storing a plurality of function data signals each corresponding to control functions to be performed at said predetermined times;

address counter means for sequentially accessing each of said time and function data signals in said storage means;

gating means for enabling said sync signals to clock said address counter means when a program is to be read into said multiple rate meter;

gating means connected to said storage means for selectively enabling the passage therethrough of a selected set of time data signals and a selected set of function data signals;

means connected to said gating means for reading out said data signals in sequence into said recirculating storage of said multiple rate meter;

means for determining when a complete set of time data signals and function data signals has been read into said recirculating storage of said multiple rate meter; and means for inhibiting said gating means for passing said sync signals to said address counter means.

10. A portable programmer for programming a multiple rate electrical energy meter of the type including a first mechanical register for continuously registering the consumption of electrical energy, at least one alternate mechanical register for registering the consumption of electrical energy during preselected time intervals, a sync signal generator for generating a sync signal, a controllable clock for generating signals normally representative of real time, a recirculating storage for storing time data signals representative of a plurality of predetermined times and for storing function data signals representative of control functions to be performed at said predetermined times, a comparator for periodically comparing the signals from said clock with the time data signals, logic circuitry responsive to an output of said comparator and to the function data signals from said recirculating storage for generating at least one function control signal in accordance with the function data signals when a comparison exists between said time data signals and the signals from said clock, and means responsive to said at least one function control signal from said logic circuitry for engaging or disengaging said at least one alternate register in accordance with said at least one function control signal, said portable programmer comprising:

first clock means operating at a predetermined frequency for generating real time signals;

means responsive to said real time signals for displaying real time;

means for setting said first clock means to a predetermined real time;

second clock means for generating high frequency clock signals, said second clock means being stepped by said sync signal from said multiple rate meter at a substantially greater frequency than the operating frequency of said first clock means;

means for comparing the real time signals and the high frequency clock signals from said first and second clock means, respectively;

means for inhibiting the operation of said controllable clock in said multiple rate meter when a comparison exists between said real time signals and said high frequency clock signals;

switch means for initiating a test procedure in said portable programmer;

timing means responsive to the actuation of said switch means for resetting said switch means after a predetermined period of time;

means responsive to the actuation of said switch means for stepping said multiple rate meter at said sync signal rate;

means for storing a plurality of sets of time data signals each corresponding to a plurality of predetermined times and for storing a plurality of function data signals each corresponding to control functions to be performed at said predetermined times;

gating means connected to said storage means for selectively enabling the passage therethrough of a selected set of time data signals and a selected set of function data signals;

means for simulating the operation of said multiple rate meter;

means connected to said gating means for reading out said data signals in sequence into said means for simulating the operation of said multiple rate meter, said reading out means being responsive to said test switch means for initiating the reading out of said data signals; and means responsive to said simulating means for indicating the successful or unsuccessful operation of said multiple rate meter.

11. A method of operating a portable programmer for programming a multiple rate electrical energy meter of the type including a first mechanical register for continuously registering the consumption of electrical energy, at least one alternate mechanical register for registering the consumption of electrical energy during preselected time intervals, a sync signal generator for generating a sync signal, a controllable clock for generating signals normally representative of real time, a recirculating storage for storing time data signals representative of a plurality of predetermined times and for storing function data signals representative of control functions to be performed at said predetermined times, a comparator for periodically comparing the signals from said clock with the time data signals, logic circuitry means responsive to an output of said comparator and to the function data signals from said recirculating storage for generating at least one function control signal in accordance with the function data signals when a comparison exists between said time data signals and the signals from said clock, and means responsive to said at least one function control signal from said logic circuitry for engaging or disengaging said at least one alternate register in accordance with said at least one function control signal, said method comprising:

operating a first clock at a specified frequency for generating real time signals, displaying in response to said real time signals the real time;

setting said first clock means to a predetermined real time;

generating high frequency clock signals by stepping a second clock with said sync signal from said multiple rate meter at a substantially greater frequency than the operating frequency of said first clock;

comparing the real time signals and the high frequency clock signals from said first and second clocks, respectively;

inhibiting the operation of said controllable clock in said multiple rate meter when a comparison exists between said real time signals and said high frequency clock signals;

storing a plurality of sets of time data signals, each corresponding to a plurality of predetermined times in a storage;

storing a plurality of function data signals each corresponding to control functions to be performed at said predetermined times in said storage;

sequentially accessing each of said time and function data signals in said storage;

selectively enabling the passage through a gate of a selected set of time data signals and a selected set of function data signals; and reading out said data signals in sequence into said recirculating storage of said multiple rate meter.

12. The method of operating the portable programmer of claim 11 further comprising the step of simulating the operation of said multiple rate meter, said step including the steps of:

sequentially advancing said data signals through a serial shift register;

clocking said data signals through said shift register;

deriving time data from said high frequency clock signals from said second clock;

comparing said derived time data with said time data signals in said shift register;

generating a function control simulation signal in accordance with said function data signals when a comparison of said derived time data and said selected time data signals exists; and comparing said function control simulation signal with said at least one function control signal generated by said multiple rate meter after said time data signals and said function data signals are read into said recirculating storage of said multiple rate meter.

* * * * *